United States Patent
White et al.

(10) Patent No.: US 10,826,133 B2
(45) Date of Patent: Nov. 3, 2020

(54) HEATING ELEMENT AND CIRCUIT MANAGING EQUIVALENT SERIES RESISTANCE OF ENERGY STORAGE CELL

(71) Applicant: Sanmina Corporation, San Jose, CA (US)

(72) Inventors: James Kenneth White, Lake Forest, CA (US); Paul Sweere, San Clemente, CA (US); Alec Shen, Irvine, CA (US)

(73) Assignee: Sanmina Corporation, San Jose, CA (US)

( * ) Notice: Subject to any disclaimer, the term of this patent is extended or adjusted under 35 U.S.C. 154(b) by 39 days.

(21) Appl. No.: 15/820,363

(22) Filed: Nov. 21, 2017

(65) Prior Publication Data

US 2018/0145374 A1   May 24, 2018

Related U.S. Application Data

(60) Provisional application No. 62/425,009, filed on Nov. 21, 2016.

(51) Int. Cl.
*H01M 10/42* (2006.01)
*H01M 10/6571* (2014.01)
(Continued)

(52) U.S. Cl.
CPC ......... *H01M 10/425* (2013.01); *H01M 2/348* (2013.01); *H01M 10/486* (2013.01);
(Continued)

(58) Field of Classification Search
CPC ............. H01M 10/425; H01M 10/615; H01M 10/6571; H01M 10/658; H01M 10/486
(Continued)

(56) References Cited

U.S. PATENT DOCUMENTS 5,362,942 A * 11/1994 Vanderslice, Jr. .......................... H01M 10/6571
219/209
5,795,664 A   8/1998 Kelly
(Continued)

FOREIGN PATENT DOCUMENTS

| CN | 102290618 B | 11/2013 |
| CN | 204156058 U | 2/2015 |
| CN | 204156058 U * | 2/2015 |

OTHER PUBLICATIONS

PCT/US2017/062898. International Search Report & Written Opinion (dated Apr. 5, 2018).

*Primary Examiner* — Sean P Cullen
(74) *Attorney, Agent, or Firm* — Julio Loza; Loza & Loza, LLP

(57) ABSTRACT

An apparatus and method of keeping an energy storage cell at or above a target temperature, includes receiving at a processing circuit, an analog voltage that is proportional to a temperature of the energy storage cell, converting, at the processing circuit, the analog voltage to a pulse-width-modulated signal having a duty cycle that is proportional to the analog voltage, and driving a switch, with the pulse-width-modulated signal, between conductive and non-conductive states to modulate a voltage passing across (or a current flowing through) a heating element in series with the switch, the heating element being in thermal communication with the energy storage cell, wherein the duty cycle of the pulse-width-modulated signal is adjusted to maintain the temperature of the energy storage cell at or above the target temperature.

20 Claims, 11 Drawing Sheets

(51) Int. Cl.
    *H01M 10/615*     (2014.01)
    *H01M 10/658*     (2014.01)
    *H01M 10/48*     (2006.01)
    *H01M 2/34*     (2006.01)
    *H05B 1/02*     (2006.01)

(52) U.S. Cl.
    CPC ....... *H01M 10/615* (2015.04); *H01M 10/658* (2015.04); *H01M 10/6571* (2015.04); *H05B 1/023* (2013.01); *H01M 2010/4271* (2013.01); *H01M 2010/4278* (2013.01); *H01M 2200/10* (2013.01)

(58) Field of Classification Search
    USPC .................................................... 429/50, 120
    See application file for complete search history.

(56) References Cited

U.S. PATENT DOCUMENTS

| | | | |
|---|---|---|---|
| 2007/0202394 A1* | 8/2007 | Viavattine | H01M 2/16 |
| | | | 429/144 |
| 2009/0303660 A1* | 12/2009 | Nair | H01G 11/46 |
| | | | 361/502 |
| 2013/0279137 A1* | 10/2013 | Gardner | B81B 7/0077 |
| | | | 361/782 |
| 2015/0171489 A1 | 6/2015 | Inaba et al. | |
| 2016/0087317 A1 | 3/2016 | Klesyk et al. | |
| 2016/0336561 A1* | 11/2016 | Miyao | H01M 10/625 |
| 2017/0256833 A1* | 9/2017 | Ciaccio | B60L 58/12 |

\* cited by examiner

HEATING ELEMENT AND CIRCUIT MANAGING EQUIVALENT SERIES RESISTANCE OF ENERGY STORAGE CELL

CROSS REFERENCE TO RELATED APPLICATIONS

This present application claims priority under 35 U.S.C. § 119(e) to U.S. Provisional Application No. 62/425,009, entitled "USING FIRMWARE-CONTROLLED HEATING ELEMENT TO MANAGE ENERGY STORAGE CELL EQUIVALENT SERIES RESISTANCE (ESR)", filed Nov. 21, 2016, and hereby expressly incorporated by reference herein.

FIELD

This application relates to systems and methods related to temperature compensation of equivalent series resistance (ESR) for energy storage cells.

BACKGROUND

Currently available energy storage cells (also known as power storage cells) typically used in memory storage devices such as Non-Volatile Dual In-Line Memory Modules (NVDIMM), Solid State Drives (SSD), Peripheral Component Interconnect (PCI) Express (PCIe) Storage Modules, fall into three power storage categories of technologies/chemistries. The three categories are known as secondary (rechargeable) batteries, electric double-layer capacitors (EDLCs) also known as supercapacitors, and hybrid devices. Each of these technologies/chemistries share a similar, potentially negative characteristic typically referred to as Equivalent Series Resistance (ESR). This characteristic has a direct effect on how much energy can be input or recovered (i.e., charged or discharged) from the energy storage cells in a given amount of time. ESR can also be an indicator of how much the energy storage cells have aged over their useful life, because the ESR of an energy storage cell increases with age. For all three of the power storage categories, the ESR is inversely proportional to the temperature (i.e., as temperature increases, the ESR decreases). These are at least two characteristics associated with ESR.

It would be beneficial to provide systems and methods including hardware/firmware methodology which offset and/or make use of these characteristics of the ESR. Such systems and methods may be used advantageously to compensate for aging and to permit more efficient charging and discharging of the energy storage cells.

SUMMARY

In one exemplary aspect, an apparatus may include an energy storage cell, a heating element in thermal communication with the energy storage cell, a thermistor coupled to the energy storage cell, an analog-to-digital converter coupled to the thermistor, a circuit configured to convert a digital output of the analog-to-digital converter into a pulse-width-modulated signal, and a switch receiving the pulse-width-modulated signal, where the switch opens and closes in accordance with the pulse-width-modulated signal to control a current passing through the heating element to control an equivalent series resistance of the energy storage cell.

The apparatus may also include thermal insulating material covering a top of the energy storage cell when the heating element is adhered to a bottom of the energy storage cell. In one exemplary aspect, the heating element may be encapsulated in a membrane that is adhered to the energy storage cell. In one example, the heating element and thermistor are encapsulated in a membrane that is adhered to the energy storage cell. In one example, the analog-to-digital converter and the circuit configured to convert the digital output of the analog-to-digital converter into the pulse-width-modulated signal are components of a processing circuit.

In one exemplary implementation, an apparatus may include an energy storage cell, a heating element in thermal communication with the energy storage cell, the heating element having a first heating element electrode coupled to a voltage and a second heating element electrode, a thermistor in thermal communication with the energy storage cell, the thermistor having a first electrode coupled to the voltage and a second electrode coupled to a system ground, thus generating an analog voltage across the thermistor that is proportional to a temperature of the energy storage cell, a processing circuit configured to receive the analog voltage of the thermistor and output a pulse-width-modulated signal, and a switch having a first switch electrode and a second switch electrode, the switch configured to be driven by the pulse-width-modulated signal to control an equivalent series resistance of the energy storage cell, the switch coupled at the first switch electrode to the second heating element electrode, the switch coupled at the second switch electrode to the system ground.

In one aspect of the apparatus, the heating element may be encapsulated in a membrane that is adhered to the energy storage cell. In another aspect, the heating element and thermistor may be encapsulated in a membrane that is adhered to the energy storage cell. In still another aspect, the processing circuit may include an analog-to-digital converter configured to convert the analog voltage to a digital output, and a circuit configured to convert the digital output of the analog-to-digital converter into the pulse-width-modulated signal.

According to one aspect, a method of controlling an equivalent series resistance of an energy storage cell may include receiving, at a processing circuit, an analog voltage that is proportional to a temperature of the energy storage cell, converting, at the processing circuit, the analog voltage to a pulse-width-modulated signal having a duty cycle that is proportional to the analog voltage, and driving a switch, with the pulse-width-modulated signal, between conductive and non-conductive states to modulate a voltage passing across a heating element in series with the switch, the heating element being in thermal communication with the energy storage cell, where the duty cycle of the pulse-width-modulated signal is adjusted to maintain the temperature of the energy storage cell at or above a target temperature.

In some aspects, a source of the voltage passing across the heating element may be the energy storage cell. In some aspects, the method may also include controlling the equivalent series resistance of the energy storage cell by maintaining the temperature of the energy storage cell at or above the target temperature. In another aspect, the analog voltage that is proportional to the temperature of the energy storage cell may be derived from a thermistor that is in thermal communication with the energy storage cell. In still another aspect, the processing circuit may be a microprocessor, and the converting, at the processing circuit, the analog voltage to the pulse-width-modulated signal having a duty cycle that is proportional to the analog voltage may be accomplished using firmware of the microprocessor.

In another exemplary implementation, an apparatus may include an energy storage cell, a heating element in thermal communication with the energy storage cell, a circuit configured to provide a measure of an equivalent series resistance (ESR) of the energy storage cell, a processing circuit configured to convert the measure of the equivalent series resistance to at least one of a pulse-width-modulated signal or a digital word, and a driving circuit configured to receive the at least one of the pulse-width-modulated signal or the digital word and drive the heating element to control the equivalent series resistance of the energy storage cell.

According to some aspects, the measure of the equivalent series resistance of the energy storage cell is at least one of a voltage proportional to a temperature of the energy storage cell or an equivalent series resistance value as determined by an energy storage cell health monitor. In some aspects, when the measure of the equivalent series resistance of the energy storage cell is the voltage proportional to the temperature of the energy storage cell, the processing circuit may include an analog-to-digital converter feeding a pulse-width-modulation conversion circuit. In other aspects, the driving circuit may be a switch that opens and closes according to a pulse-width-modulated signal output by the pulse-width-modulation conversion circuit. In still other aspects, when the measure of the equivalent series resistance of the energy storage cell is the equivalent series resistance value as determined by the energy storage cell health monitor, the processing circuit may include an equivalent series resistance value processing circuit feeding a pulse-width-modulation conversion circuit. In such an aspect, the driving circuit may be a switch that opens and closes according to a pulse-width-modulated signal output by the pulse-width-modulation conversion circuit. In some aspects, when the measure of the equivalent series resistance of the energy storage cell is the voltage proportional to the temperature of the energy storage cell, the processing circuit may include an analog-to-digital converter, whose input is the voltage and whose output is a digital word, and a digital word conversion circuit, whose input is the digital word and whose output is a second digital word. According to some aspects, the driving circuit may be a digital-to-analog converter that takes, as an input, the second digital word, and outputs an analog voltage to drive the heating element. In some aspects, the circuit configured to provide the measure of the equivalent series resistance of the energy storage cell may be a temperature sensing circuit including a thermistor coupled to the energy storage cell and an analog-to-digital converter coupled to the thermistor. In some aspects, the circuit configured to provide the measure of the equivalent series resistance of the energy storage cell is an energy storage cell health monitor configured to measure the equivalent series resistance of the energy storage cell. In some aspects, the driving circuit is a switch or a digital to analog converter.

In some aspects, a method of controlling an equivalent series resistance of an energy storage cell, may include receiving, at a processing circuit, a measure of the equivalent series resistance of the energy storage cell, converting, at the processing circuit, the measure of the equivalent series resistance of the energy storage cell to a driving signal, and applying the driving signal to a circuit that controls a heating element thermally coupled to the energy storage cell to maintain a temperature of the energy storage cell at or above a target temperature to control the equivalent series resistance of the energy storage cell.

In some aspects, the measure of the equivalent series resistance may be the temperature of the energy storage cell as measured by a temperature sensing device in thermal communication with the energy storage cell. In other aspects, the measure of the equivalent series resistance may be a measured value of the equivalent series resistance of the energy storage cell as measured by an energy storage cell health monitor.

DETAILED DESCRIPTION

Figure 1:
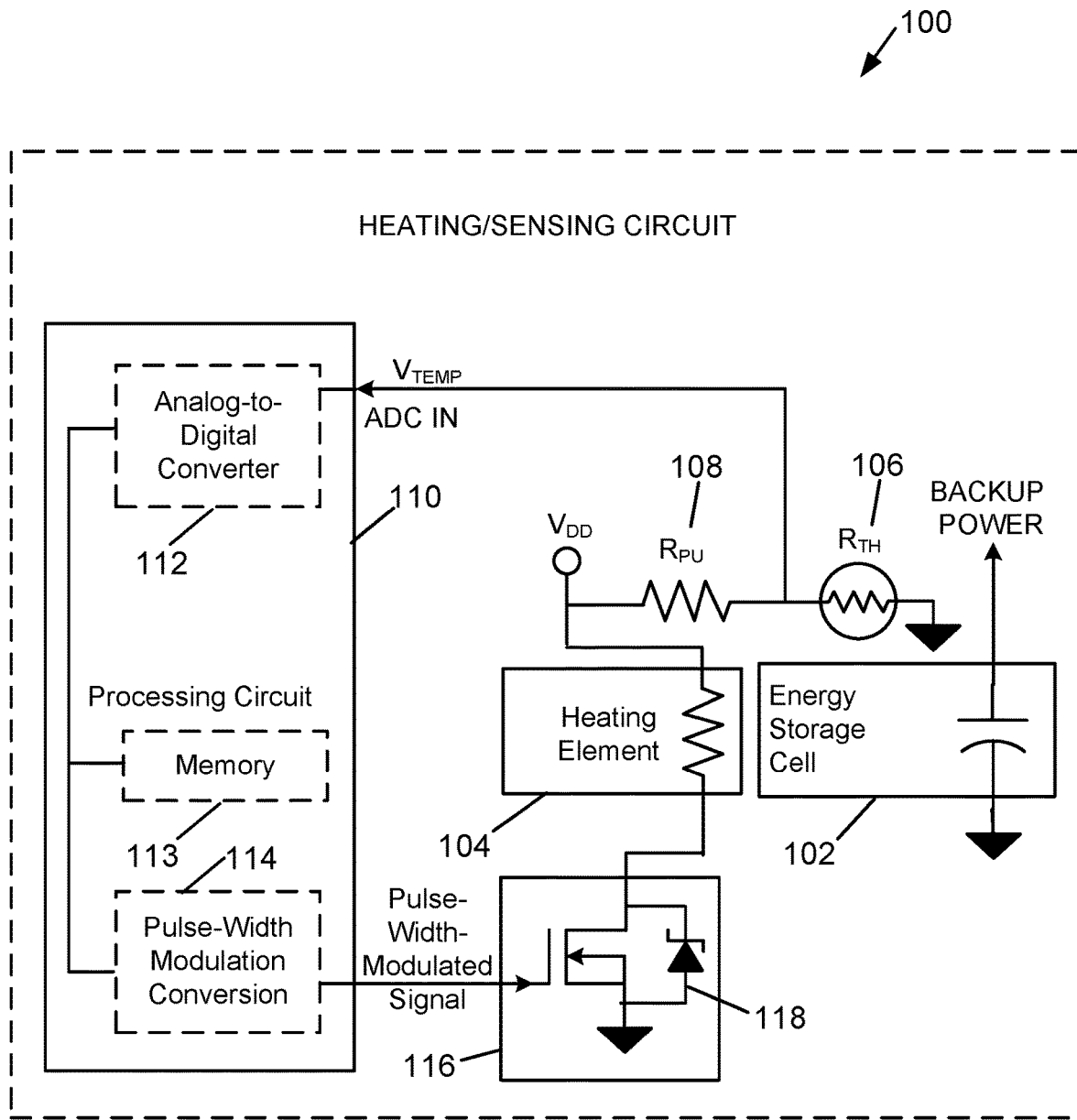
FIG. 1 is a schematic diagram of a heating/sensing circuit in accordance with some aspects described herein.

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a method of a process may be omitted from flow diagrams presented herein in order not to obscure the aspects of the disclosure. Similarly, well known components in a device may be omitted from figures and descriptions thereof presented herein in order not to obscure the aspects of the disclosure.

Overview

Energy storage cells fall into three categories: secondary (rechargeable) batteries, electric double-layer capacitors (EDLCs) also known as supercapacitors, and hybrid devices. Each of these technologies/chemistries share a similar, potentially negative characteristic typically referred to as Equivalent Series Resistance (ESR). However, it is recognized that the ESR of an energy storage cell is inversely proportional to temperature and that maintaining the temperature of the energy storage cell at or slightly above room temperature (approximately 25° C.) provides for acceptable values of ESR for each of the three technologies/chemistries mentioned above. Discussed herein are systems and methods that can control the ESR of an energy storage cell by controlling the temperature of the energy storage cell. The system in which the energy storage cell is located may be cooled to a temperature below room temperature while the energy storage cell is maintained at a temperature at or above room temperature. The ESR of the energy storage cell may be controlled in some aspects by receiving at a processing circuit an analog voltage that is proportional to a temperature of the energy storage cell, by then converting, at the processing circuit, the analog voltage to a pulse-width-modulated signal having a duty cycle that is proportional to the analog voltage, and by then driving a switch, with the pulse-width-modulated signal, between conductive and non-conductive states to modulate a voltage passing across a heating element in series with the switch, the heating element being in thermal communication with the energy storage cell, wherein the duty cycle of the pulse-width-modulated signal is adjusted to maintain the temperature of the energy storage cell at or above a target temperature, such as room temperature.

The conventional approaches to dealing with ESR involve monitoring of ESR, controlling the number and rate of charge/discharge cycles of an energy storage cell, and critically over-provisioning the energy storage cell to compensate for increasing ESR as the energy storage cell ages. The present disclosure, however, provides a way to manipulate the ESR dynamically to an end-user's advantage to provide a more efficient use of the existing capacity of the energy storage cell, to reduce the amount of over-provisioning necessary, and to permit faster charging times than would be possible with conventional methods. This allows for lower costs of the energy storage cell and increases the availability of the energy storage cell to the end-user.

Disclosed herein are techniques to control the ESR of the energy storage cell by controlling the temperature of the energy storage cell using a firmware-controlled heating element. One example implementation may involve use of a firmware-controlled electric blanket that is placed in thermal contact with the energy storage cell. The firmware-controlled electric blanket may also include a thermistor (e.g., a precision thermistor) to supply a voltage proportional to the temperature of the energy storage cell to a firmware-controlled processing circuit (e.g., a microprocessor). The purpose of the firmware-controlled electric blanket may be to keep the energy storage cell at or slightly above room temperature (approximately 25° C.) during normal operation. This allows the system or subsystem to which the energy storage cell is associated to be operated at a lower temperature (e.g., down to 0° C. ambient) without incurring the most significant downside of the ESR characteristic, which generally occurs between 0° C. and 25° C. Keeping the energy storage cell at or above room temperature may allow a designer/user to derate the functional range of the ESR by more than half of its worst-case specification.

Another aspect of this method is that small increases in the local temperature of the blanket can offset the slowly rising ESR as the energy storage cell ages. In this way, a user can take advantage of shorter charging times and more efficient backup power discharge cycles over a longer period of the service life of the energy storage cell.

Heating/Sensing Circuits

FIG. 1 is a schematic diagram of a heating/sensing circuit 100 in accordance with some aspects described herein. FIG. 1 depicts an energy storage cell 102. The energy storage cell 102 may be, for example, a secondary battery (also known as a rechargeable battery), an electric double-layer capacitor (EDLC) (also known as a supercapacitor), or a hybrid device. The disclosure is not limited to these three examples of energy storage cells. In general, as used herein, an energy storage cell may be any type of energy storage device having an ESR whose value varies inversely with temperature.

The heating/sensing circuit 100 further includes a heating element 104 thermally coupled to (e.g., in thermal communication with) the energy storage cell 102. The heating element 104 may be any type of heating element such as a resistive heating element. The disclosure is not limited to resistive heating elements. The heating element 104 may be in the form of a blanket, such as a blanket. The heating element 104 may be in the form of a blanket, a heating element, or a grid. The heating element 104 may be incorporated into an adhesive layer that may be adhered to a side (top, bottom, and/or side) of the energy storage cell 102. According to some aspects, a heating element 104 may be in simultaneous thermal communication with multiple sides of the energy storage cell 102 (e.g., top and bottom).

The heating/sensing circuit 100 may also include a thermistor 106 ($R_{TH}$) thermally coupled to (e.g., in thermal communication with) the energy storage cell 102. According to some aspects, the thermistor 106 may be a surface mount device. As known to those of skill in the art, a thermistor is a two terminal device whose resistance changes with temperature. The thermistor 106 of the heating/sensing circuit 100 may be coupled to a voltage source at one terminal and ground at the second terminal. According to some aspects, the voltage source may be the energy storage cell 102. According to some aspects, the voltage source may be system $V_{CC}$ or system $V_{DD}$ or some other source of system voltage. The coupling may be through a pull-up resistor 108 ($R_{PU}$). A pull-up resistor 108 may be used, for example, to reference the thermistor 106 to $V_{DD}$. The pull-up resistor 108 may supply a bias current to the thermistor 106.

The configuration of the pull-up resistor 108 and the thermistor 106 may form a voltage divider circuit. The output of the voltage divider circuit may be an analog voltage whose value is proportional to the temperature of the energy storage cell 102. The analog voltage is identified as $V_{TEMP}$ in the schematic diagram of the heating/sensing circuit 100 in FIG. 1. The temperature of the energy storage cell 102 may be considered as one measure of an ESR value of the energy storage cell 102. Accordingly, the analog voltage identified as $V_{TEMP}$, which is proportional to the temperature of the energy storage cell 102, may also be considered as one measure of the ESR of the energy storage cell.

The heating element 104 and/or thermistor 106 may, for example, be encapsulated in a membrane that is adhered to the energy storage cell 102 or may be printed onto a circuit board for an integrated module.

The heating/sensing circuit 100 may also include a processing circuit 110 (e.g., a microprocessor). The processing circuit 110 may include, among other things, circuitry configured as an analog-to-digital converter 112. The analog voltage associated with the thermistor, $V_{TEMP}$, may be input to the processing circuit 110 (e.g., input to the analog-to-digital converter 112). The processing circuit 110 may also include a pulse-width-modulation conversion 114 circuit/function/module configured to convert a digital output of the analog-to-digital converter 112 into a pulse-width-modulated signal. The conversion may be accomplished, for example, using a look-up table or a formula. In some aspects, where the processing circuit is, for example, a microprocessor, converting the analog voltage to the pulse-width-modulated signal having a duty cycle that is proportional to the analog voltage may be accomplished using firmware of the microprocessor. The duty cycle of the pulse-width-modulated signal may be changed by the pulse-width-modulation conversion 114 circuit/function/module. The analog-to-digital converter 112 and/or the pulse-width-modulation conversion 114 circuit/function/module may be programmable by firmware installed to the processing circuit 110. The firmware may be stored in a memory 113 of the processing circuit 110. In general, the processing circuit 110 may control the heating element 104 temperature through a switch 116 (e.g., a FET switch, an N-channel MOSFET) operating in pulse-width-modulation mode and which has an integral analog-to-digital converter 112 (ADC) to monitor the thermistor 106 temperature. According to some aspects, the processing circuit 110 may utilize firmware customized for this application.

The heating/sensing circuit 100 may also include a switch 116 receiving the pulse-width-modulated signal, wherein the switch 116 opens and closes in accordance with the pulse-width-modulated signal. In other words, the heating/sensing circuit 100 may also include a driving circuit, where the driving circuit may be a switch that opens and closes according to a pulse-width-modulated signal output by the pulse-width-modulation conversion circuit. In an open state, the switch would present a high impedance, which would prevent current from passing through the heating element 104. In the closed state, the switch would present a low impedance, which would allow current to pass through the heating element 104. According to one aspect, a field effect transistor (FET), such as an N-channel MOSFET, may be configured as the switch 116. A Schottky diode 118 is illustrated in parallel with the terminals of the field effect transistor. The Schottky diode 118 may be an intrinsic part of all MOSFETs and may be referred to as the "body diode". This Schottky diode 118 (parasitic element) is illustrated in the schematic as a reminder to avoid incorrect connections.

The switch 116 may be used to modulate the current flowing through the heating element 104 in accordance with the duty cycle of the pulse-width-modulation signal. By modulating the current in accordance with the duty cycle of the pulse-width-modulation signal, the heating/sensing circuit 100 may be configured to increase or decrease the amount of heat being applied to the energy storage cell 102. Accordingly, the heating/sensing circuit 100 may keep the energy storage cell 102 at or above a target temperature, such as room temperature (approximately 25° C.).

Figure 2:
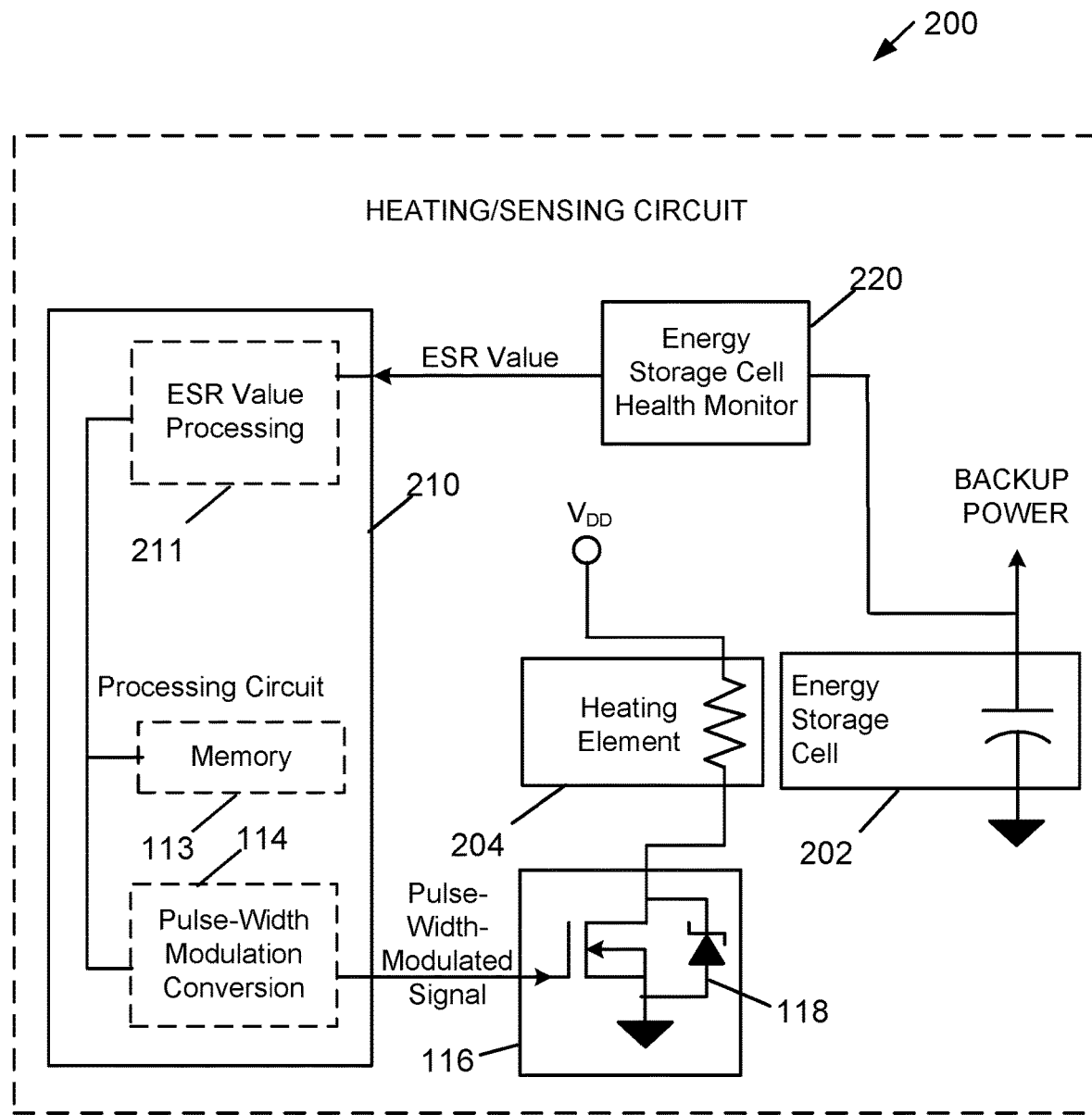
FIG. 2 is a schematic diagram of a heating/sensing circuit in accordance with some aspects described herein.

FIG. 2 is a schematic diagram of a heating/sensing circuit 200 in accordance with some aspects described herein. FIG. 2 depicts an energy storage cell 202. The energy storage cell 202 may be, for example, a secondary battery (also known as a rechargeable battery), an electric double-layer capacitor (EDLC) (also known as a supercapacitor), or a hybrid device. The disclosure is not limited to these three examples of energy storage cells. In general, as used herein, an energy storage cell may be any type of energy storage device having an ESR whose value varies inversely with temperature.

The heating/sensing circuit 200 further includes a heating element 204 thermally coupled to (e.g., in thermal communication with) the energy storage cell 202. The heating element 204 may be any type of heating element such as a resistive heating element. The disclosure is not limited to resistive heating elements. The heating element 204 may be in the form of a blanket, such as a blanket. The heating element 204 may be in the form of a heating element or a grid. The heating element 204 may be incorporated into an adhesive layer that may be adhered to a side (top, bottom, and/or side) of the energy storage cell 202. According to some aspects, a heating element 204 may be in simultaneous thermal communication with multiple sides of the energy storage cell 202 (e.g., top and bottom).

As an alternative to using energy storage cell temperature as the input to a feedback and control loop (as depicted in FIG. 1), a measured ESR of the energy storage cell could be used. The measured ESR of the energy storage cell may, of course, be considered as one example of a measure of the ESR of the energy storage cell. FIG. 2 depicts an energy storage cell health monitor 220 circuit/function/module. In the exemplary illustration of FIG. 2, the energy storage cell health monitor 220 circuit/function/module is implemented external to the processing circuit 210. Those of skill in the art will recognize that the energy storage cell health monitor 220 circuit/function/module may be implemented either internal to or external to the processing circuit 210. The energy storage cell health monitor 220 circuit/function/module may periodically measure the ESR of the energy storage cell 202 to assess the health of the energy storage cell 202. In some aspects, the measurement of the ESR of the energy storage cell 202 may be done daily; however the disclosure is not limited to this periodicity of measurement. The value of the measured ESR derived by the energy storage cell health monitor 220 circuit/function/module could be used to determine a target temperature at which the energy storage cell should be maintained in order to maintain the ESR within a target range. The ESR value processing 211 circuit/function/module may convert the measured ESR value (e.g., a first digital word) into a value (e.g., a second digital word) that is then applied to the pulse-width-modulation conversion 114 circuit/function/module. Conversion may be made, for example, by use of a look-up table or a formula. The pulse-width-modulation conversion 114 circuit/function/module may be configured to convert a digital output of the ESR value processing 211 circuit/function/module into a pulse-width-modulated signal. The duty cycle of the pulse-width-modulated signal may be changed by the pulse-width-modulation conversion 114 circuit/function/module. Alternatively, the measured ESR value could be applied directly to the pulse-width-modulation conversion 114 circuit/function/module. The measured ESR value could be used to determine a target temperature for the heating element 204 (and therefore a target temperature for the energy storage cell 202).

The pulse-width-modulation conversion 114 circuit/function/module and switch 116 may operate as described above in FIG. 1. Their descriptions will not be repeated for sake of brevity. Similar to the features described with respect to FIG. 1, the heating/sensing circuit 200 of FIG. 2 may keep the energy storage cell 202 at or above a target temperature.

Figure 3:
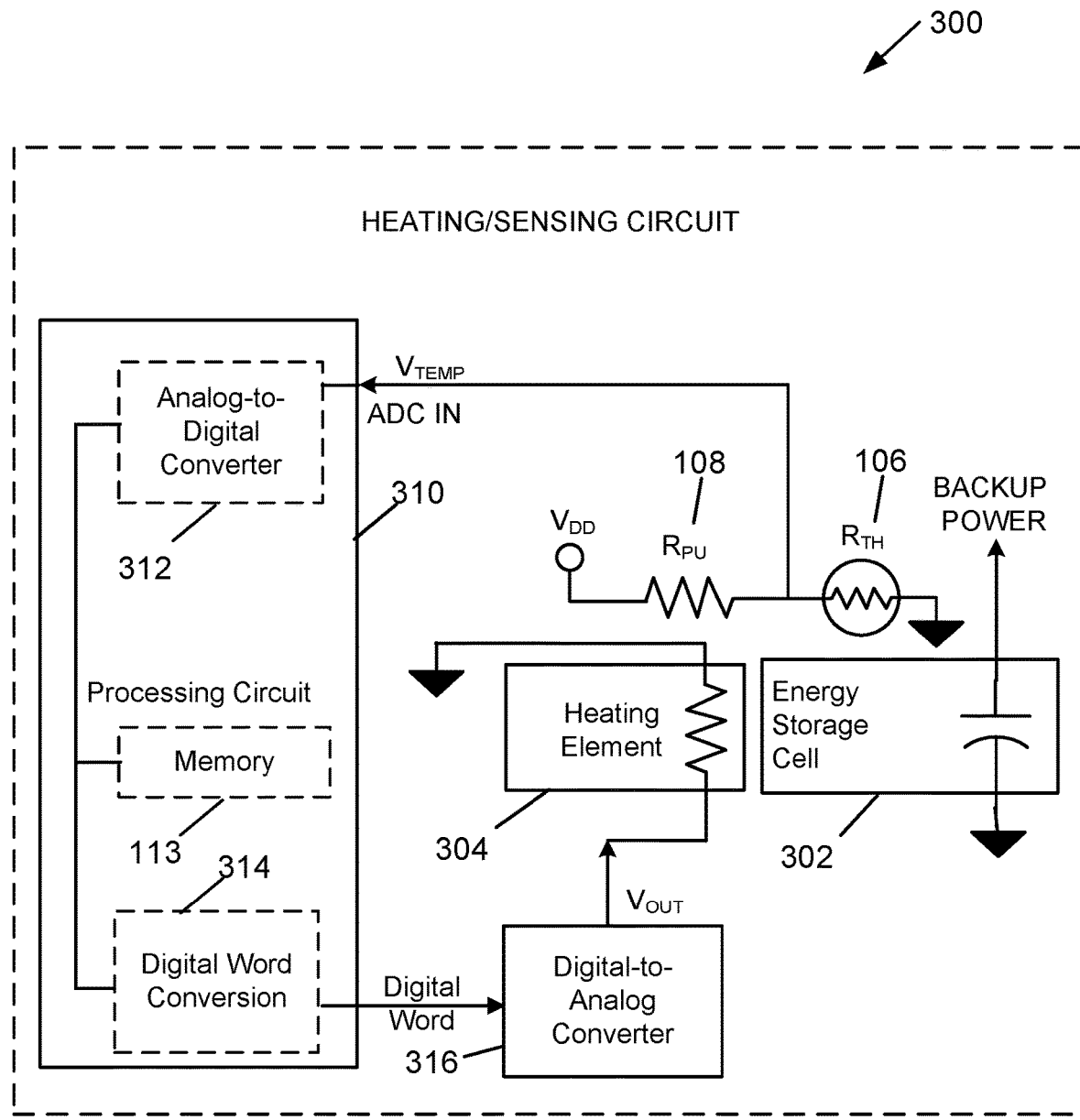
FIG. 3 is a schematic diagram of a heating/sensing circuit in accordance with some aspects described herein.

FIG. 3 is a schematic diagram of a heating/sensing circuit 300 in accordance with some aspects described herein. FIG. 3 depicts an energy storage cell 302. The energy storage cell 302 may be, for example, a secondary battery (also known as a rechargeable battery), an electric double-layer capacitor (EDLC) (also known as a supercapacitor), or a hybrid device. The disclosure is not limited to these three examples of energy storage cells. In general, as used herein, an energy storage cell may be any type of energy storage device having an ESR whose value varies inversely with temperature.

The heating/sensing circuit 300 further includes a heating element 304 thermally coupled to (e.g., in thermal communication with) the energy storage cell 302. The heating element 304 may be any type of heating element such as a resistive heating element. The disclosure is not limited to resistive heating elements. The heating element 304 may be in the form of a blanket, such as a blanket. The heating element 304 may be in the form of a heating element or a grid. The heating element 304 may be incorporated into an adhesive layer that may be adhered to a side (top, bottom, and/or side) of the energy storage cell 302. According to some aspects, a heating element 304 may be in simultaneous thermal communication with multiple sides of the energy storage cell 302 (e.g., top and bottom).

The heating/sensing circuit 300 may also include a temperature monitoring system, such as a thermistor 106 ($R_{TH}$) thermally coupled to (e.g., in thermal communication with) the energy storage cell 102. The thermistor 106 and its associated pull-up resistor 108 ($R_{PU}$) were described in connection with FIG. 1. Their description will not be repeated herein for the sake of brevity. The temperature monitoring system may supply an analog voltage referred to herein as $V_{TEMP}$ to a processing circuit as described in connection with FIG. 1.

The heating/sensing circuit 300 may also include a processing circuit 310 (e.g., a microprocessor). The processing circuit 310 may include, among other things, circuitry configured as an analog-to-digital converter 312. The analog voltage associated with the thermistor, $V_{TEMP}$, may be input to the processing circuit 310 (e.g., input to the analog-to-digital converter 312). The processing circuit 310 may also include a digital word conversion 314 circuit/function/module configured to convert a digital output of the analog-to-digital converter 312 into a digital word that is used to drive a digital-to-analog converter 316 external to the processing circuit 310. In some aspects, the digital-to-analog converter 316 may be internal to the processing circuit 310. The conversion may be accomplished, for example, using a look-up table or a formula. In some aspects, where the processing circuit is, for example, a microprocessor, converting the analog voltage to the pulse-width-modulated signal having a duty cycle that is proportional to the analog voltage may be accomplished using firmware of the microprocessor. In general, the processing circuit 310 may convert the analog voltage ($V_{TEMP}$) to a digital word used to drive the digital-to-analog converter 316. The analog-to-digital converter 312, the digital word conversion 314 circuit/function/module, and/or the digital-to-analog converter 316 may be programmable by firmware installed to the processing circuit 310. The firmware may be stored in a memory 113 of the processing circuit 310 or in a memory (not shown) external to the processing circuit 310. In general, the processing circuit 310 may control the heating element 304 temperature by changing the digital word that is used to drive the digital-to-analog converter 316. By changing the digital word that is used to drive the digital-to-analog converter 316, the heating/sensing circuit 300 may be configured to increase or decrease the amount of heat being applied to the energy storage cell 302. In the exemplary heating/sensing circuit 300, an analog DC voltage ($V_{OUT}$) may be used to control the heating element 304. For example, the analog DC voltage could be generated from the output of the digital-to-analog converter 316 driven by the processing circuit 310. Accordingly, the heating/sensing circuit 300 may keep the energy storage cell 302 at or above a target temperature. According to some aspects, the processing circuit 310 may utilize firmware customized for this application.

First Exemplary System

Figure 4:
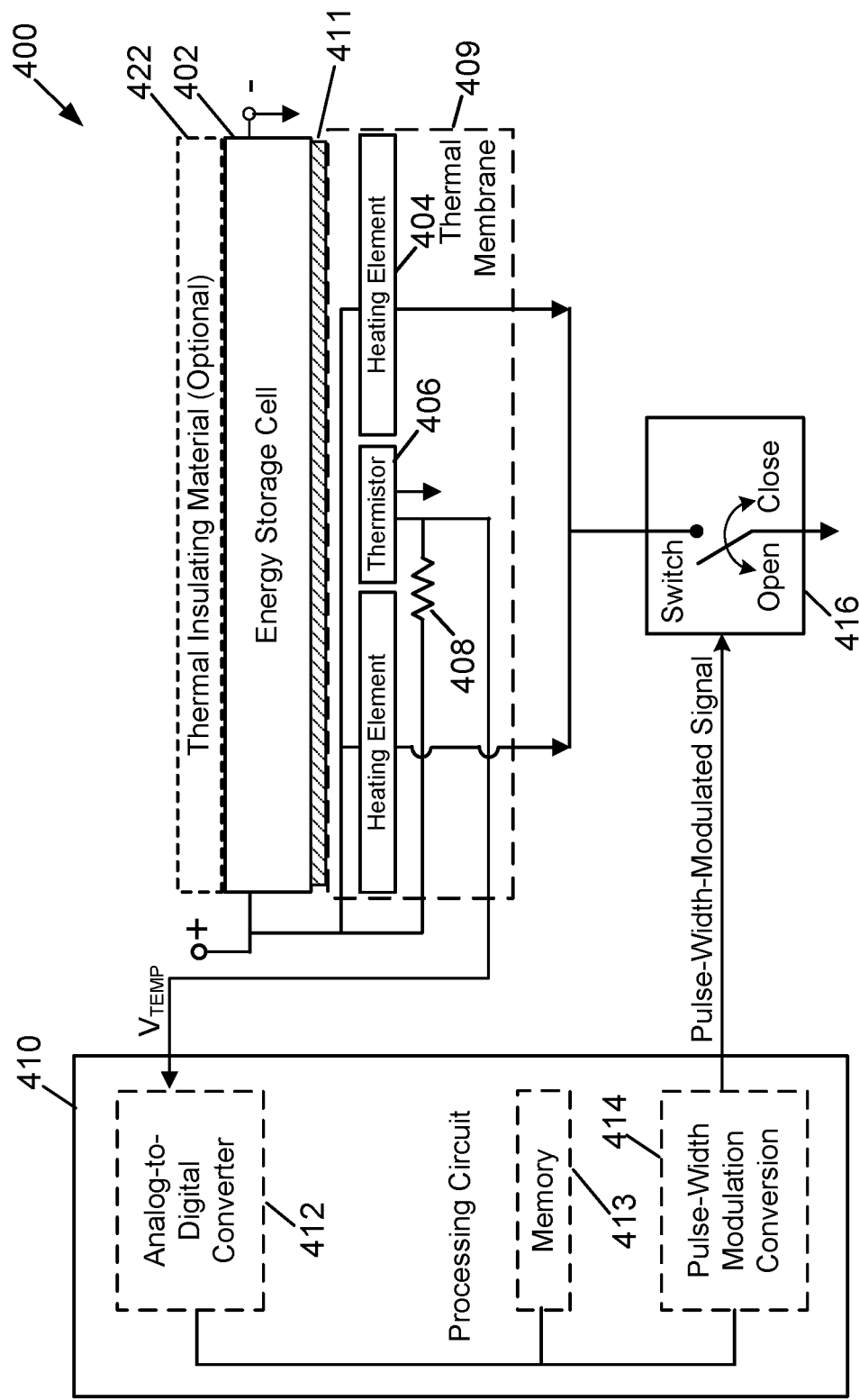
FIG. 4 is a first exemplary heating/sensing system implemented using an energy storage cell in accordance with some aspects described herein.

FIG. 4 is a first exemplary heating/sensing system 400 implemented using an energy storage cell 402 in accordance with some aspects described herein. In the aspect presented in FIG. 4, the heating element 404 and/or thermistor 406 may be encapsulated in a membrane 409, which has an adhesive backing 411 to allow direct attachment to the energy storage cell 402. In an alternative configuration, the heating element 404 (with or without the thermistor 406) may comprise a blanket (not shown), which may cover the energy storage cell 402. The energy storage cell 402 may be implemented using a prismatic style of energy storage cell. A prismatic energy storage cell may generally be a flat cell (as opposed to a cylindrical or button cell). The prismatic energy storage cell may be rectangular in shape; however, other shapes are within the scope of the disclosure. The prismatic energy storage cell may be formed using a layered approach. The disclosure is not limited to prismatic styles of energy storage cells. In general, as used herein, an energy storage cell 402 may be any type of energy storage device having an ESR whose value varies inversely with temperature.

The heating/sensing system 400 further includes a heating element 404 thermally coupled to (e.g., in thermal communication with) the energy storage cell 402. The heating element 404 may be any type of heating element such as a resistive heating element. The disclosure is not limited to resistive heating elements. The heating element 404 may be in the form of a blanket, such as a blanket. The heating element 404 may be in the form of a heating element or a grid. The heating element 404 may be incorporated into an adhesive layer, that may be adhered to a side (top, bottom, and/or side) of the energy storage cell 402. According to some aspects, a heating element 404 may be in simultaneous thermal communication with multiple sides of the energy storage cell 402 (e.g., top and bottom).

The heating/sensing system 400 may also include a thermistor 406 thermally coupled to (e.g., in thermal communication with) the energy storage cell 402. According to some aspects, the thermistor 406 may be a surface mount device. As known to those of skill in the art, a thermistor is a two terminal device whose resistance changes with temperature. The thermistor 406 of the heating/sensing system 400 may be coupled to a voltage source at one terminal and ground at the second terminal. According to some aspects, the voltage source may be the energy storage cell 402. According to some aspects, the voltage source may be system $V_{CC}$ or system $V_{DD}$ or some other source of system voltage. The coupling may be through a pull-up resistor 408 ($R_{PU}$). A pull-up resistor 408 may be used, for example, to reference the thermistor 406 to $V_{DD}$ or to the positive terminal of the energy storage cell 402. The pull-up resistor 408 may supply a bias current to the thermistor 406.

The configuration of the pull-up resistor 408 and the thermistor 406 may form a voltage divider circuit. The output of the voltage divider circuit may be an analog voltage whose value is proportional to the temperature of the energy storage cell 402. The analog voltage is identified as $V_{TEMP}$ in the schematic diagram of the heating/sensing system 400 in FIG. 4.

As shown in the exemplary aspect of FIG. 4, the heating element 404 and/or thermistor 406 may be encapsulated in a membrane 409. The membrane 409 may have an adhesive backing 411 to allow direct attachment to the energy storage cell 402. In some aspects, the thermistor 406 may be surface mounted to the energy storage cell 402, while the heating element 404 in the membrane 409 may be adhered to the energy storage cell 402 and the thermistor 406 using the adhesive backing 411.

The heating/sensing system 400 may also include a processing circuit 410 (e.g., a microprocessor). The processing circuit 410 may include, among other things, circuitry configured as an analog-to-digital converter 412. The analog voltage associated with the thermistor, $V_{TEMP}$, may be input to the processing circuit 410 (e.g., input to the analog-to-digital converter 412). The processing circuit 410 may also include a pulse-width-modulation conversion circuit 414 configured to convert a digital output of the analog-to-digital converter 412 into a pulse-width-modulated signal. The duty cycle of the pulse-width-modulated signal may be changed by the pulse-width-modulation conversion circuit 414. The analog-to-digital converter 412 and/or the pulse-width-modulation conversion circuit 414 may be programmable by firmware installed to the processing circuit 410. The firmware may be stored in a memory 413 of the processing circuit 410.

The heating/sensing system 400 may also include a switch 416 receiving the pulse-width-modulated signal, wherein the switch 416 opens and closes in accordance with the pulse-width-modulated signal. In other words, the heating/sensing circuit 100 may also include a driving circuit, where the driving circuit may be a switch that opens and closes according to a pulse-width-modulated signal output by the pulse-width-modulation conversion circuit. In an open state, the switch would present a high impedance, preventing current from flowing through the heating element 404. In the closed state, the switch would present a low impedance, allowing current to flow through the heating element 404. According to one aspect, a field effect transistor (FET), such as an N-channel MOSFET, may be configured as the switch 416. The switch 416 may be used to modulate the current flowing through the heating element 404 in accordance with the duty cycle of the pulse-width-modulated signal. By modulating the current in accordance with the duty cycle of the pulse-width-modulated signal, the heating/sensing system 400 may be configured to increase or decrease the amount of heat being applied to the energy storage cell 402. Accordingly, the heating/sensing system 400 may keep the energy storage cell 402 at or above a target temperature.

Thermal insulating material 422 may optionally be added over the energy storage cell 402 to insulate it thermally from the ambient air temperature. This could have the beneficial effect of reducing the heat loss from the energy storage cell 402 into the ambient air. Therefore, less power may be required for the heating element 404 to maintain the energy storage cell 402 temperature. According to one aspect, the heating/sensing system 400 may include thermal insulating material 422 covering a top of the energy storage cell 402 when the heating element 404 is adhered to a bottom of the energy storage cell 402.

In general, the apparatus of FIG. 4 includes an energy storage cell 402, a heating element 404 in thermal communication with the energy storage cell 402, the heating element 404 having a first heating element electrode coupled to a voltage and a second heating element electrode, a thermistor 406 in thermal communication with the energy storage cell 402, the thermistor 406 having a first electrode coupled to the voltage and a second electrode coupled to a system ground, thus generating an analog voltage across the thermistor 406 that is proportional to a temperature of the energy storage cell 402, a processing circuit 410 configured to receive the analog voltage of the thermistor ($V_{TEMP}$) and output a pulse-width-modulated signal, and a switch 416 having a first switch electrode and a second switch electrode, the switch configured to be driven by the pulse-width-modulated signal to control an equivalent series resistance of the energy storage cell, the switch coupled at the first switch electrode to the second heating element electrode, the switch coupled at the second switch electrode to the system ground.

Second Exemplary System

Figure 5:
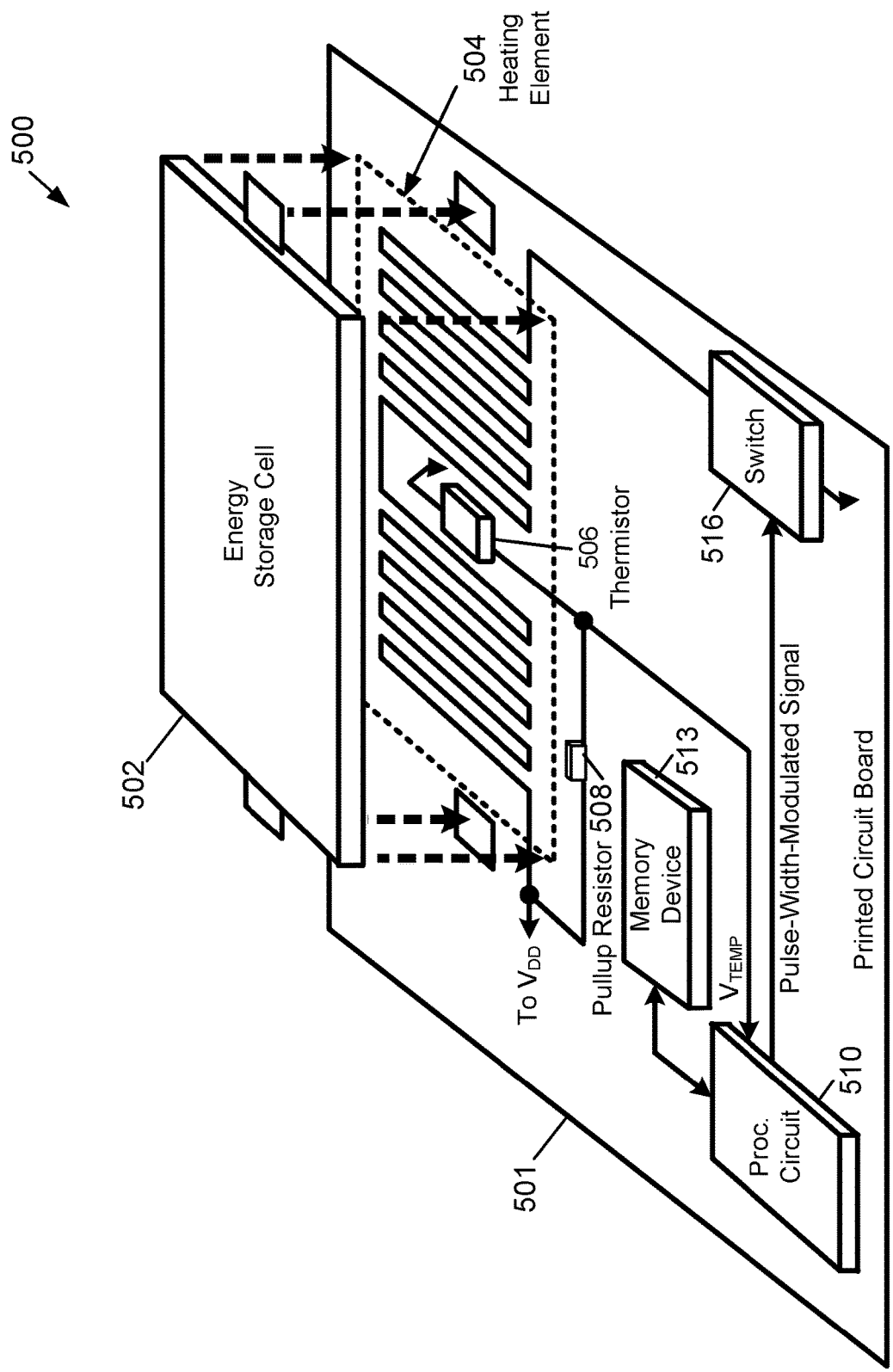
FIG. 5 is an exemplary heating/sensing system implemented using an energy storage cell similar to that of FIG. 1 in accordance with some aspects described herein.

FIG. 5 is an exemplary heating/sensing system 500 implemented using an energy storage cell 502 similar to that of FIG. 1 in accordance with some aspects described herein. In the aspect of FIG. 5, the energy storage cell 502 may be integrated onto the same printed circuit board 501 as a memory device 513 (e.g., an NVDIMM, SSD, etc.), a processing circuit 510, a driving circuit (e.g., switch 516), and a pull-up resistor 508. According to this aspect, a heating element 504 may be printed on, and a thermistor 506 may be surface mounted to, the printed circuit board 501 in the area directly under which the energy storage cell 502 resides.

FIG. 5 is illustrated as being implemented using a prismatic style of energy storage cell. A prismatic cell may generally be a flat cell (as opposed to a cylindrical or button cell). The prismatic cell may be rectangular in shape; however, other shapes are within the scope of the disclosure. The prismatic cell may be formed using a layered approach. The disclosure is not limited to prismatic styles of energy storage cells. In general, as used herein, an energy storage cell 502 may be any type of energy storage device having an ESR whose value varies inversely with temperature. FIG. 5 is illustrated as having all components mounted and/or printed on a printed circuit board 501.

The heating/sensing system 500 further includes a heating element 504 thermally coupled to (e.g., in thermal communication with) the energy storage cell 502. The heating element 504 may be any type of heating element such as a resistive heating element. The disclosure is not limited to resistive heating elements. In the example of FIG. 5, the heating element 504 may be, for example, an etched copper grid (e.g., resistive trace). The heating element 504 may be thermally coupled to the bottom side of the energy storage cell 502 using, for example, a thermally conductive compound such as a grease or an adhesive.

The heating/sensing system 500 may also include a thermistor 506 thermally coupled to (e.g., in thermal communication with) the energy storage cell 502. According to some aspects, the thermistor 506 may be a surface mount device. As known to those of skill in the art, a thermistor is a two terminal device whose resistance changes with temperature. The thermistor 506 of the heating/sensing system 500 may be coupled to a voltage source at one terminal and ground at the second terminal. According to some aspects, the voltage source may be the energy storage cell 502. According to some aspects, the voltage source may be system $V_{CC}$ or system $V_{DD}$ or some other source of system voltage. The coupling may be through a pull-up resistor 508 ($R_{PU}$). A pull-up resistor 508 may be used, for example, to reference the thermistor 506 to $V_{DD}$. The pull-up resistor 508 may supply a bias current to the thermistor 506.

The configuration of the pull-up resistor 508 and the thermistor 506 may form a voltage divider circuit. The output of the voltage divider circuit may be an analog voltage whose value is proportional to the temperature of the energy storage cell 502. The analog voltage is identified as $V_{TEMP}$ in the schematic diagram of the heating/sensing system 500 in FIG. 5.

The heating/sensing system 500 may also include a processing circuit 510 (e.g., a microprocessor). The processing circuit 510 may include, among other things, circuitry configured as an analog-to-digital converter (not shown). The analog voltage associated with the thermistor, $V_{TEMP}$, may be input to the processing circuit 510 (e.g., input to the analog-to-digital converter). The processing circuit 510 may also include a pulse-width-modulation conversion circuit (not shown) configured to convert a digital output of the analog-to-digital converter into a pulse-width-modulated signal. The duty cycle of the pulse-width-modulated signal may be changed by the pulse-width-modulation conversion circuit. The analog-to-digital converter and/or the pulse-width-modulation conversion circuit may be programmable by firmware installed to the processing circuit 510. The firmware may be stored in a memory (not shown) of the processing circuit 510 or in memory device 513.

The heating/sensing system 500 may also include a switch 516 receiving the pulse-width-modulated signal, wherein the switch 516 opens and closes in accordance with the pulse-width-modulated signal. In other words, the heating/sensing circuit 100 may also include a driving circuit, where the driving circuit may be a switch that opens and closes according to a pulse-width-modulated signal output by the pulse-width-modulation conversion circuit. In an open state, the switch would present a high impedance, preventing current from flowing through the heating element 504. In the closed state, the switch would present a low impedance to ground, allowing current to flow through the heating element 504. According to one aspect, a field effect transistor (FET), such as an N-channel MOSFET, may be configured as the switch 516. The switch 516 may be used to modulate the current flowing through the heating element 504 in accordance with the duty cycle of the pulse-width-modulated signal. By modulating the current in accordance with the duty cycle of the pulse-width-modulated signal, the heating/sensing system 500 may be configured to increase or decrease the amount of heat being applied to the energy storage cell 502. Accordingly, the heating/sensing system 500 may keep the energy storage cell 502 at or above a target temperature.

Third Exemplary System

Figure 6:
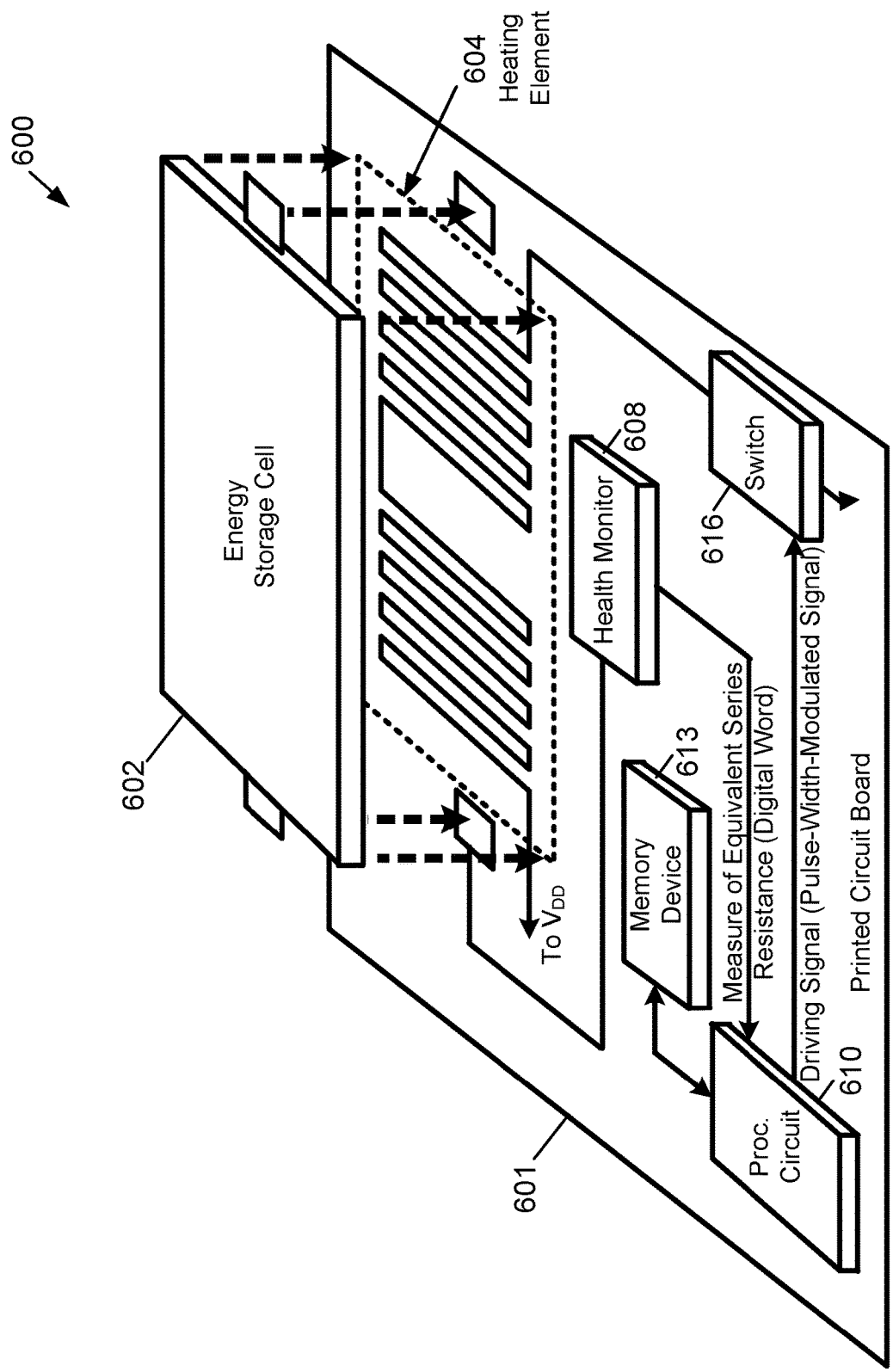
FIG. 6 is an exemplary heating/sensing system implemented using an energy storage cell similar to that of FIG. 2 in accordance with some aspects described herein.

FIG. 6 is an exemplary heating/sensing system 600 implemented using an energy storage cell 602 similar to that of FIG. 2 in accordance with some aspects described herein. In the aspect of FIG. 6, an energy storage cell 602 may be integrated onto the same printed circuit board 601 as a memory device 613 (e.g., an NVDIMM, SSD, etc.), a processing circuit 610, a driving circuit (e.g., switch 616), and an energy storage cell health monitor 608. According to this aspect, the heating element 604 may be printed on the printed circuit board 601 in an area directly under which the energy storage cell 602 resides.

FIG. 6 is illustrated as being implemented using a prismatic style of energy storage cell. A prismatic cell may generally be a flat cell (as opposed to a cylindrical or button cell). The prismatic cell may be rectangular in shape; however, other shapes are within the scope of the disclosure. The prismatic cell may be formed using a layered approach. The disclosure is not limited to prismatic styles of energy storage cells. In general, as used herein, an energy storage cell 602 may be any type of energy storage device having an ESR whose value varies inversely with temperature. FIG. 6 is illustrated as having all components mounted and/or printed on a printed circuit board 601.

The heating/sensing system 600 further includes a heating element 604 thermally coupled to (e.g., in thermal communication with) the energy storage cell 602. The heating element 604 may be any type of heating element such as a resistive heating element. The disclosure is not limited to resistive heating elements. In the example of FIG. 6, the heating element 604 may be, for example, an etched copper grid (e.g., resistive trace). The heating element 604 may be thermally coupled to the bottom side of the energy storage cell 602 using, for example, a thermally conductive compound such as a grease or an adhesive.

The heating/sensing system 600 may also include an energy storage cell health monitor 608. The energy storage cell health monitor 608 circuit/function/module periodically measures the ESR of the energy storage cell. The energy storage cell health monitor 608 circuit/function/module outputs a measure of equivalent series resistance as a digital word that may be input to the processing circuit 610.

The heating/sensing system 600 may also include a processing circuit 610 (e.g., a microprocessor). The processing circuit 610 may receive as its input the output of the energy storage cell health monitor 608 circuit/function/module. The processing circuit 610 may also include a pulse-width-modulation conversion circuit (not shown) configured to convert a digital output of the energy storage cell health monitor 608 circuit/function/module into a pulse-width-modulated signal. The duty cycle of the pulse-width-modulated signal may be changed by the pulse-width-modulation conversion circuit. The pulse-width-modulation conversion circuit (not shown) of the processing circuit 610 may be programmable by firmware installed to the processing circuit 610. The firmware may be stored in a memory (not shown) of the processing circuit 610 or in memory device 613.

The heating/sensing system 600 may also include a switch 616 receiving the pulse-width-modulated signal, wherein the switch 616 opens and closes in accordance with the pulse-width-modulated signal. In other words, the heating/sensing circuit 100 may also include a driving circuit, where the driving circuit may be a switch that opens and closes according to a pulse-width-modulated signal output by the pulse-width-modulation conversion circuit. In an open state, the switch would present a high impedance, preventing current from flowing through the heating element 604. In the closed state, the switch would present a low impedance to ground, allowing current to flow through the heating element 604. According to one aspect, a field effect transistor (FET), such as an N-channel MOSFET, may be configured as the switch 616. The switch 616 may be used to modulate the current flowing through the heating element 604 in accordance with the duty cycle of the pulse-width-modulated signal. By modulating the current in accordance with the duty cycle of the pulse-width-modulated signal, the heating/sensing system 600 may be configured to increase or decrease the amount of heat being applied to the energy storage cell 602. Accordingly, the heating/sensing system 600 may keep the energy storage cell 602 at or above a target temperature.

Fourth Exemplary System

Figure 7:
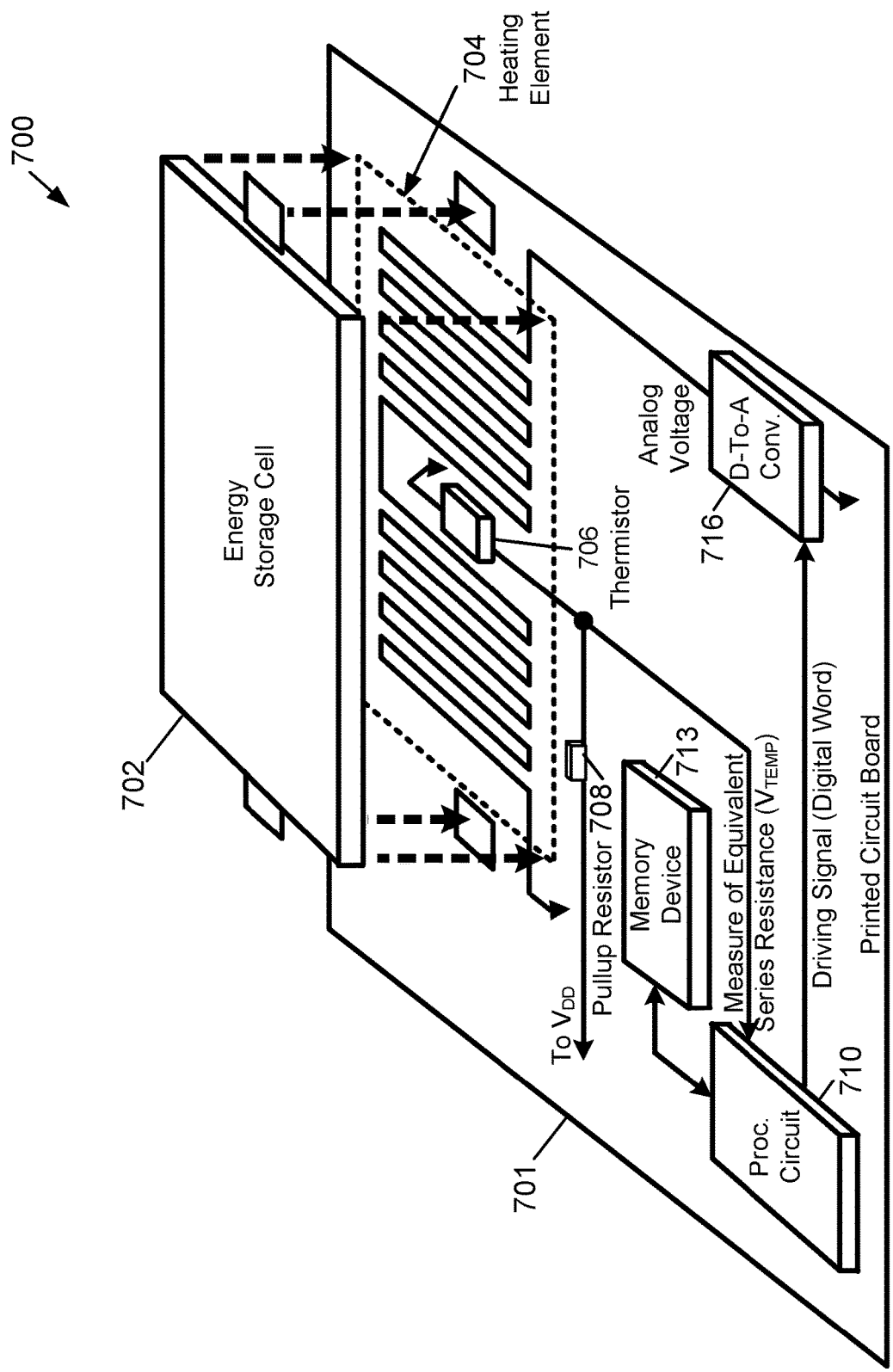
FIG. 7 is an exemplary heating/sensing system implemented using an energy storage cell similar to that of FIG. 3 in accordance with some aspects described herein.

FIG. 7 is an exemplary heating/sensing system 700 implemented using an energy storage cell 702 similar to that of FIG. 3 in accordance with some aspects described herein. In the aspect of FIG. 7, the energy storage cell 702 may be integrated onto the same printed circuit board 701 as a memory device 713 (e.g., an NVDIMM, SSD, etc.), a processing circuit 710, a driving circuit (e.g., digital-to-analog converter 716) (D-To-A Converter), and a pull-up resistor 708. According to this aspect, the heating element 704 may be printed on, and a thermistor 706 may be surface mounted to, the printed circuit board 701 in the area directly under which the energy storage cell 702 resides.

FIG. 7 is illustrated as being implemented using a prismatic style of energy storage cell. A prismatic cell may generally be a flat cell (as opposed to a cylindrical or button cell). The prismatic cell may be rectangular in shape; however, other shapes are within the scope of the disclosure. The prismatic cell may be formed using a layered approach. The disclosure is not limited to prismatic styles of energy storage cells. In general, as used herein, an energy storage cell 702 may be any type of energy storage device having an ESR whose value varies inversely with temperature. FIG. 7 is illustrated as having all components mounted and/or printed on a printed circuit board 701.

The heating/sensing system 700 further includes a heating element 704 thermally coupled to (e.g., in thermal communication with) the energy storage cell 702. The heating element 704 may be any type of heating element such as a resistive heating element. The disclosure is not limited to resistive heating elements. In the example of FIG. 7, the heating element 704 may be, for example, an etched copper grid (e.g., resistive trace). The heating element 704 may be thermally coupled to the bottom side of the energy storage cell 702 using, for example, a thermally conductive compound such as a grease or an adhesive.

The heating/sensing system 700 may also include a thermistor 706 thermally coupled to (e.g., in thermal communication with) the energy storage cell 702. According to some aspects, the thermistor 706 may be a surface mount device. As known to those of skill in the art, a thermistor is a two terminal device whose resistance changes with temperature. The thermistor 706 of the heating/sensing system 700 may be coupled to a voltage source at one terminal and ground at the second terminal. According to some aspects, the voltage source may be the energy storage cell 702. According to some aspects, the voltage source may be system $V_{CC}$ or system $V_{DD}$ or some other source of system voltage. The coupling may be through a pull-up resistor 708 ($R_{PU}$). A pull-up resistor 708 may be used, for example, to reference the thermistor 706 to $V_{DD}$. The pull-up resistor 708 may supply a bias current to the thermistor 706.

The configuration of the pull-up resistor 708 and the thermistor 706 may form a voltage divider circuit. The output of the voltage divider circuit may be an analog voltage whose value is proportional to the temperature of the energy storage cell 702. The analog voltage is identified as $V_{TEMP}$ in the schematic diagram of the heating/sensing system 700 in FIG. 7.

The heating/sensing system 700 may also include a processing circuit 710 (e.g., a microprocessor). The processing circuit 710 may include, among other things, circuitry configured as an analog-to-digital converter (not shown). The analog voltage associated with the thermistor, $V_{TEMP}$, may be input to the processing circuit 710 (e.g., input to the analog-to-digital converter). The processing circuit 710 may also include a digital word conversion circuit (not shown) configured to convert the digital output of the analog-to-digital converter into a digital word selected to drive the digital-to-analog converter 716. The output of the processing circuit 710 is identified as "Driving Signal (Digital Word)" in the schematic diagram of the heating/sensing system 700 in FIG. 7. The analog-to-digital converter and/or the digital word conversion circuit may be programmable by firmware installed to the processing circuit 710. The firmware may be stored in a memory (not shown) of the processing circuit 710 or in memory device 713.

The heating/sensing system 700 may also include a digital-to-analog converter 716 receiving driving signal (digital word) output from the processing circuit 710. The output of the digital-to-analog converter 716 may be used to drive the heating element 704. By increasing or decreasing the analog voltage output by the digital-to-analog converter 716, the heating/sensing system 700 may be configured to increase or decrease the amount of heat being applied to the energy storage cell 702. Accordingly, the heating/sensing system 700 may keep the energy storage cell 702 at or above a target temperature.

Exemplary Methods

Figure 8:
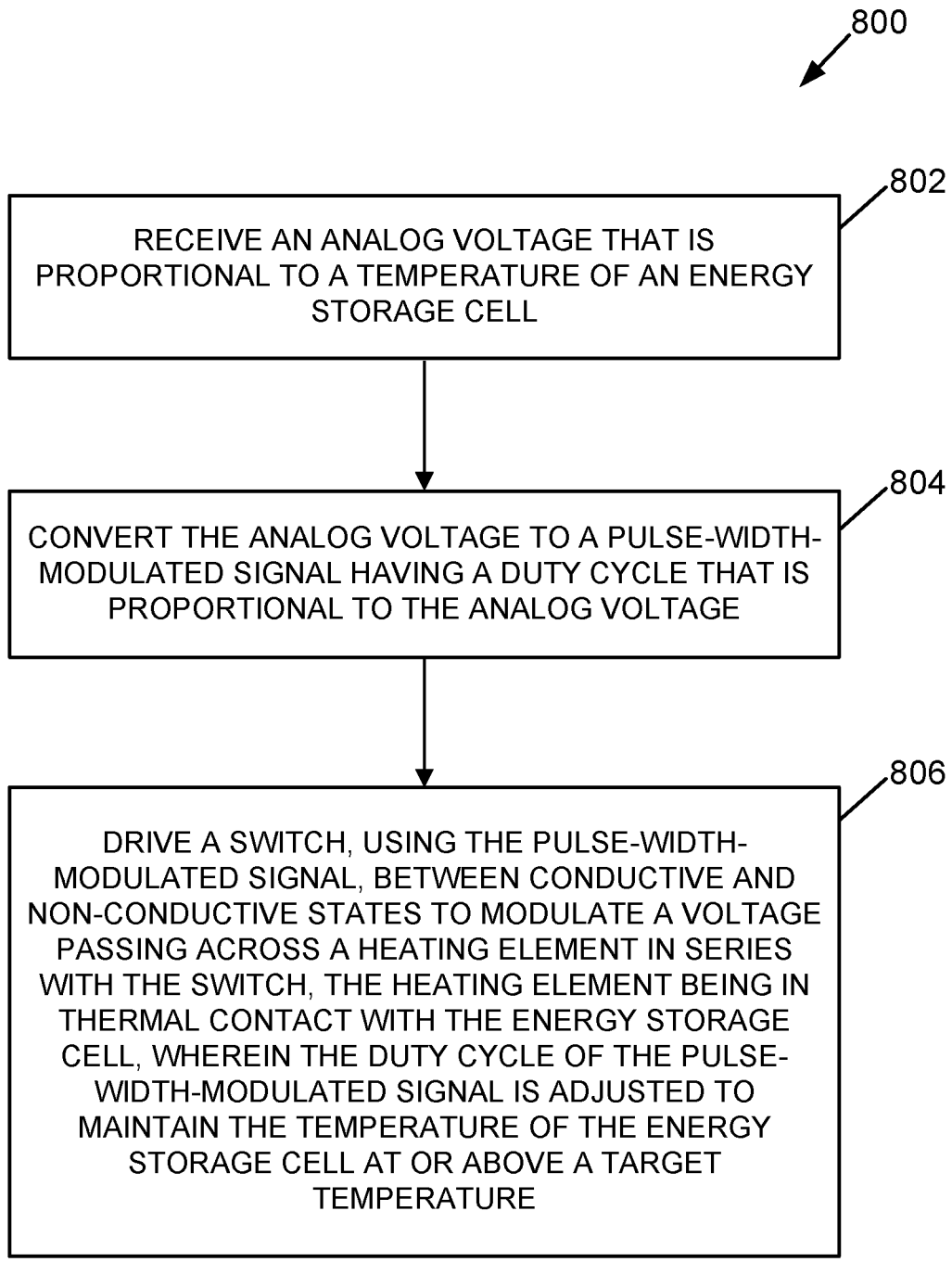
FIG. 8 is a block diagram of an exemplary method of keeping an energy storage cell at or above a target temperature in accordance with some aspects described herein.

FIG. 8 is a block diagram of an exemplary method 800 of controlling an equivalent series resistance of an energy storage cell in accordance with some aspects described herein. The energy storage cell may be exemplified by those energy storage cells (e.g., 102, 402, 502) depicted in FIGS. 1, 4, and 5.

According to some aspects, a processing circuit (e.g., 110, 410, 510) may receive an analog voltage (e.g., $V_{TEMP}$) that is proportional to a temperature of the energy storage cell 802 (e.g., 102, 402, 502). The analog voltage may be obtained using, for example, a thermistor (e.g., 106, 406, 506). The processing circuit may convert the analog voltage to a pulse-width-modulated signal having a duty cycle that is proportional to the analog voltage 804. The pulse-width-modulated signal may drive a switch (e.g., 116, 416, 516) between conductive and non-conductive states (e.g., closed and open states) to modulate a voltage passing across a heating element (e.g., 104, 404, 504) (or the current flowing through the heating element) in series with the switch, the heating element being in thermal communication with the energy storage cell, wherein the duty cycle of the pulse-width-modulated signal is adjusted to maintain the temperature of the energy storage cell at or above a target temperature 806.

According to some aspects, the source of the voltage passing across the heating element is the energy storage cell. According to other aspects, the source of the voltage passing across the heating element is $V_{CC}$, $V_{DD}$, or some other source of system voltage.

According to some aspects, the method may further include controlling an equivalent series resistance of the energy storage cell by maintaining the temperature of the energy storage cell at or above the target temperature.

According to some aspects, the method may further include receiving, at the processing circuit, the analog voltage that is proportional to the temperature of the energy storage cell from a thermistor that is in thermal communication the with the energy storage cell.

According to some aspects, the processing circuit may be a microprocessor and the method may further include converting, at the processing circuit, the analog voltage to the pulse-width-modulated signal having a duty cycle that is proportional to the analog voltage using firmware of the microprocessor. The firmware may be stored in a memory of the processing circuit. The memory may be internal or external to the processing circuit.

Figure 9:
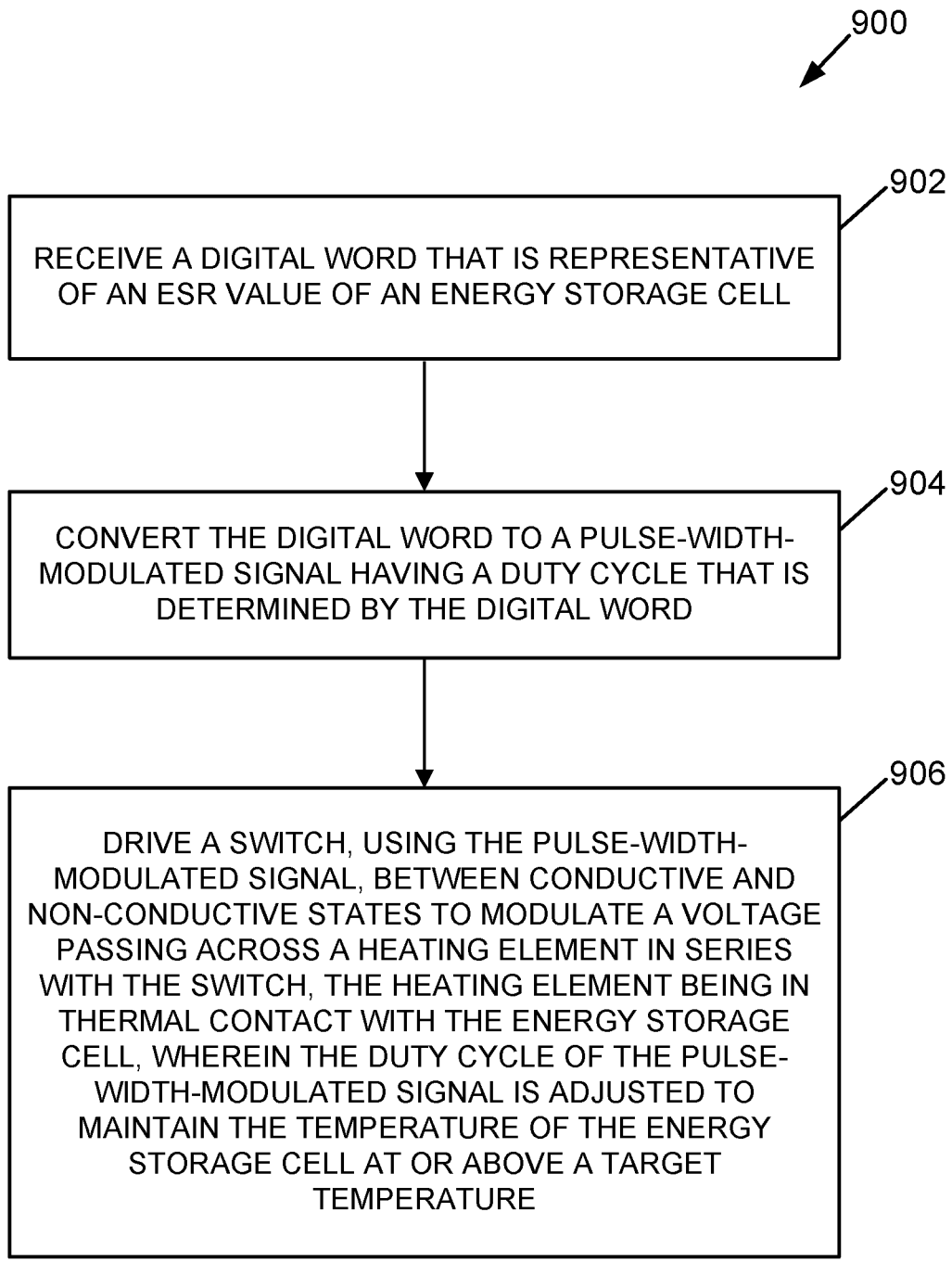
FIG. 9 is a block diagram of an exemplary method of controlling an equivalent series resistance of an energy storage cell in accordance with some aspects described herein.

FIG. 9 is a block diagram of an exemplary method 900 of controlling an equivalent series resistance of an energy storage cell in accordance with some aspects described herein. The energy storage cell may be exemplified by the energy storage cell (e.g., 202) depicted in FIG. 2.

According to some aspects, a processing circuit (e.g., 210) may receive a digital word (e.g., ESR Value) that is representative of an ESR value of the energy storage cell (e.g., 202) 902. The ESR value may be determined by an energy storage cell health monitor (e.g., 220) circuit/function/module. The processing circuit (e.g., 210) may convert the digital word (e.g., ESR Value) to a pulse-width-modulated signal having a duty cycle that is determined by the digital word 904. The pulse-width-modulated signal may drive a switch (e.g., 116, FIG. 2) between conductive and non-conductive states (e.g., closed and open states) to modulate a voltage passing across a heating element (e.g., 204) (or the current flowing through the heating element) in series with the switch, the heating element being in thermal communication with the energy storage cell, wherein the duty cycle of the pulse-width-modulated signal is adjusted to maintain the temperature of the energy storage cell at or above a target temperature 906.

According to some aspects, the source of the voltage passing across the heating element is the energy storage cell. According to other aspects, the source of the voltage passing across the heating element is $V_{CC}$, $V_{DD}$, or some other source of system voltage.

According to some aspects, the method may further include controlling an equivalent series resistance of the energy storage cell by maintaining the temperature of the energy storage cell at or above the target temperature.

According to some aspects, the processing circuit may be a microprocessor and the method may further include converting, at the processing circuit, the digital word determined by the energy storage sell health monitor to the pulse-width-modulated signal having a duty cycle that is determined by the digital word using firmware of the microprocessor. The firmware may be stored in a memory of the processing circuit. The memory may be internal or external to the processing circuit.

Figure 10:
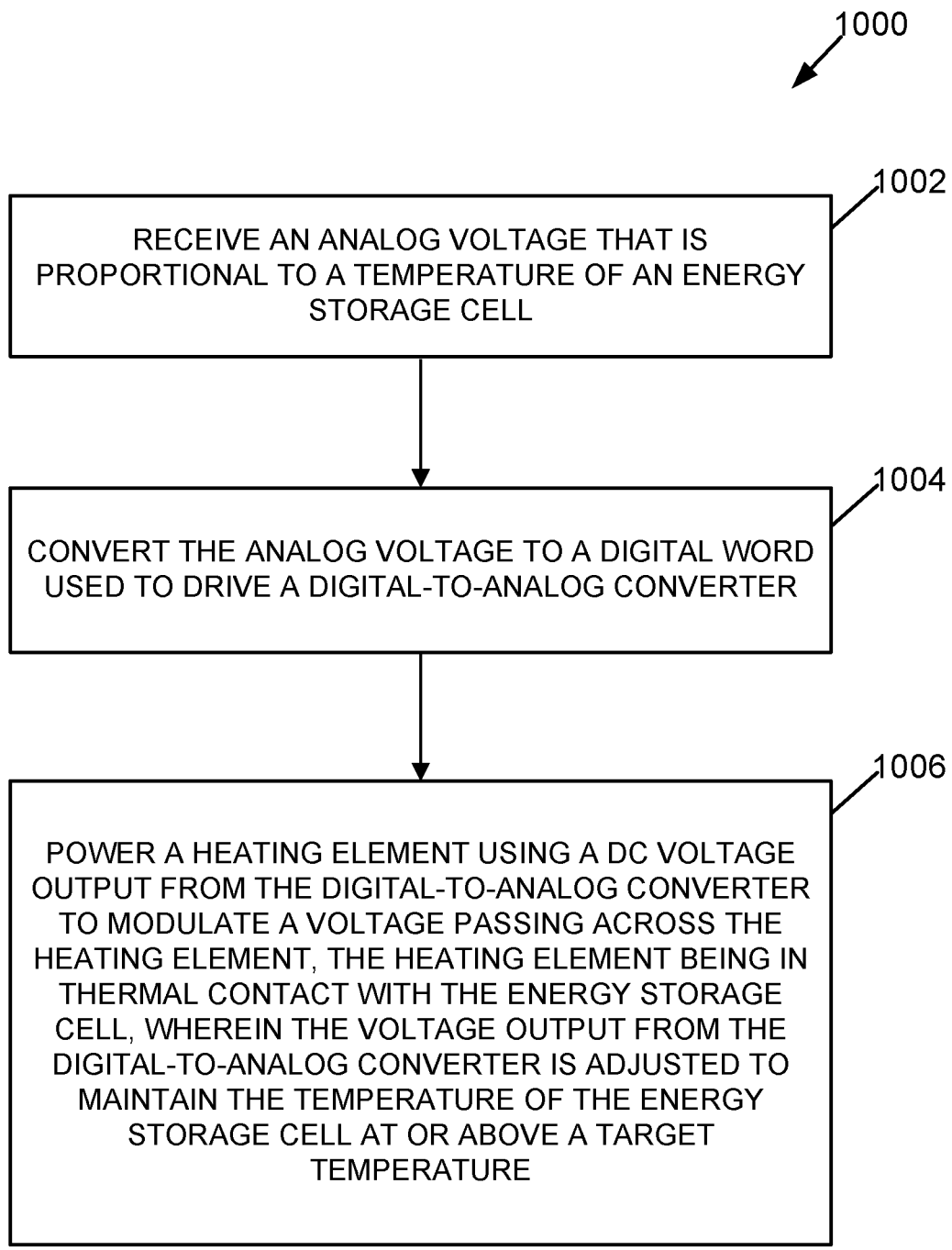
FIG. 10 is a block diagram of an exemplary method of controlling an equivalent series resistance of an energy storage cell in accordance with some aspects described herein.

FIG. 10 is a block diagram of an exemplary method 1000 of controlling an equivalent series resistance of an energy storage cell in accordance with some aspects described herein. The energy storage cell may be exemplified by the energy storage cell (e.g., 302) depicted in FIG. 3.

According to some aspects, a processing circuit (e.g., 310) may receive an analog voltage (e.g., $V_{TEMP}$) that is proportional to a temperature of the energy storage cell 1002. The processing circuit (e.g., 310) may convert the analog voltage to a digital word using an on-board analog-to-digital converter (e.g., 312). The processing circuit may also include a digital word conversion circuit (e.g., 314) configured to convert a digital output of the analog-to-digital converter into a digital word that is used to drive a digital-to-analog converter (e.g., 316) external to the processing circuit. In some aspects, the digital-to-analog converter may be internal to the processing circuit. The conversion may be accomplished, for example, using a look-up table or a formula. In some aspects, where the processing circuit is, for example, a microprocessor, converting the analog voltage to the pulse-width-modulated signal having a duty cycle that is proportional to the analog voltage may be accomplished using firmware of the microprocessor. In general, the processing circuit may convert the analog voltage ($V_{TEMP}$) to a digital word used to drive the digital-to-analog converter 1004. The analog-to-digital converter, the digital word conversion circuit, and/or the digital-to-analog circuit may be programmable by firmware installed to the processing circuit. The firmware may be stored in a memory (e.g., 113) of the processing circuit or in a memory external to the processing circuit. In general, the processing circuit may control a heating element (e.g., 304) temperature by changing the digital word that is used to drive the digital-to-analog converter. By changing the digital word that is used to drive the digital-to-analog converter, the heating/sensing circuit may be configured to increase or decrease the amount of heat being applied to the energy storage cell. An analog DC voltage ($V_{OUT}$) may be used to control the heating element. For example, the analog DC voltage could be generated from the output of the digital-to-analog converter driven by the processing circuit. For example, the processing circuit may power the heating element using the DC voltage (Vout) output from the digital-to-analog converter to modulate a voltage passing across the heating element, the heating element being in thermal communication with the energy storage cell, wherein the voltage output from the digital-to-analog converter is adjusted to maintain the temperature of the energy storage cell at or above a target temperature 1006. Accordingly, the heating/sensing circuit may keep the energy storage cell at or above a target temperature. According to some aspects, the processing circuit may utilize firmware customized for this application.

According to some aspects, the source of the voltage passing across the heating element is the DC voltage (Vout) output from the digital-to-analog converter.

According to some aspects, the method may further include controlling an equivalent series resistance of the energy storage cell by maintaining the temperature of the energy storage cell at or above the target temperature.

Figure 11:
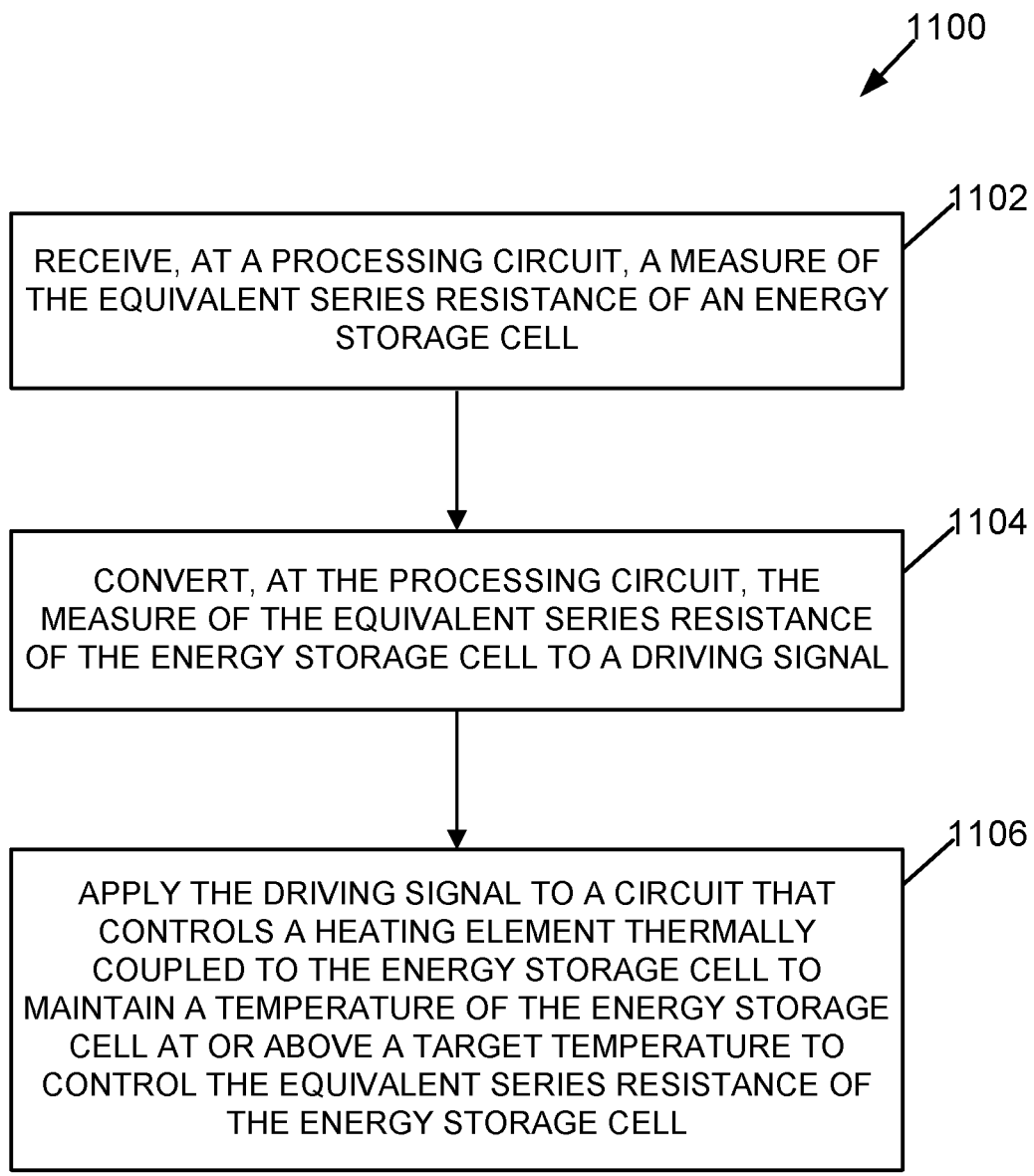
FIG. 11 is a block diagram of an exemplary method of controlling an equivalent series resistance of an energy storage cell in accordance with some aspects described herein.

FIG. 11 is a block diagram of an exemplary method 1100 of controlling an equivalent series resistance of an energy storage cell (e.g., 102, 202, 302, 402, 502) in accordance with some aspects described herein. The method may include receiving, at a processing circuit (e.g., 110, 210, 310, 410, 510), a measure of the equivalent series resistance of the energy storage cell 1102. The method may further include converting, at the processing circuit, the measure of the equivalent series resistance of the energy storage cell to a driving signal 1104 (e.g., a pulse-width-modulated signal or a digital word used to drive a digital-to-analog converter). The method may still further include applying the driving signal to a circuit that controls a heating element (e.g., 104, 204, 304, 404, 504) thermally coupled to the energy storage cell to maintain a temperature of the energy storage cell at or above a target temperature to control the equivalent series resistance of the energy storage cell 1106.

According to some aspects, the measure of the equivalent series resistance is a temperature of the energy storage cell as measured by a temperature sensing device (e.g., 106, 406, 506) in thermal communication with the energy storage cell or a measured value of the equivalent series resistance of the energy storage cell (e.g., ESR value, FIG. 2) as determined by an energy storage cell health monitor (e.g., 220) circuit/function/module. According to some aspects, a circuit configured to provide the measure of the equivalent series resistance of the energy storage cell may be a temperature sensing circuit including a thermistor coupled to the energy storage cell and an analog-to-digital converter coupled to the thermistor.

Utility

Laboratory data confirms that the methods described herein are feasible, can be implemented inexpensively, and can deliver the benefits as described above. The benefits may include allowing energy storage cell provisioning to be optimized for lower cost and reduced real estate demands. The benefits may also include permitting more aggressive charging times without risking acceleration of aging, which improves the availability of the energy storage cell as a backup power reservoir. The benefits may also include improvements to the efficiency of the discharge operation allowing better usage of the energy available in the energy storage cell. The benefits may still further include compensation for aging to allow the other mentioned benefits to be realized over a greater percentage of the energy storage cell's service life, thereby extending the useful service life of the energy storage cell.

Alternate Implementations

The processing circuit and firmware controlled approach described above could be replaced with analog circuitry to perform the feedback and control function. The analog circuitry would not involve any firmware.

insulating material may be added over the energy storage cell to insulate it thermally from the ambient air temperature. This could have the beneficial effect of reducing the heat loss from the energy storage cell into the ambient air. Therefore, less power may be required for the heating element to maintain the energy storage cell temperature.

It may be possible to implement control of the energy storage cell without a dedicated heating element. For example, typically in circuitry surrounding energy storage cells, there are circuits to perform health monitoring and other tasks, which discharge significant amounts of power through a load resistor, thereby generating heat. That load resistor could also be used as a heating element for the energy storage cell. In other words, the heating element may be configured as a load resistor of circuitry adjacent to the energy storage cell.

In one or more aspects herein, a processing circuit includes at least one processing device, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory is a non-transitory memory device and may be an internal memory or an external memory, and the memory may be a single memory device or a plurality of memory devices. The memory may be a read-only memory, random access memory, volatile memory, non-volatile memory, static memory, dynamic memory, flash memory, cache memory, and/or any non-transitory memory device that stores digital information.

As may be used herein, the term "operable to" or "configurable to" or "configured to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "inter-connecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, frequencies, wavelengths, component values, integrated circuit process variations, temperature variations, rise and fall times, and/or noise. Such relativity between items ranges from a difference of a few percent to magnitude differences.

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

What is claimed is:

1. An apparatus, comprising:
   a printed circuit board;
   an energy storage cell mounted on the printed circuit board;
   a heating element in thermal communication with the energy storage cell,
   the heating element completely positioned between the printed circuit board and the energy storage cell;
   a circuit configured to provide a measure of an equivalent series resistance (ESR) of the energy storage cell;
   a processing circuit, mounted on the printed circuit board, configured to convert the measure of the ESR to at least one of a pulse-width-modulated signal or a digital word; and
   a driving circuit configured to receive the at least one of the pulse-width-modulated signal or the digital word and drive the heating element to control the ESR of the energy storage cell.

2. The apparatus of claim 1, wherein the heating element is a plurality of resistive traces defined on the printed circuit board.

3. The apparatus of claim 1,
   wherein the driving circuit is configured to receive the at least one of the pulse-width-modulated signal or the digital word and drive the heating element to maintain a constant temperature to control the ESR of the energy storage cell.

4. The apparatus of claim 1, wherein the driving circuit is configured to receive the at least one of the pulse-width-modulated signal or the digital word and drive the heating element to maintain a constant temperature to control the ESR of the energy storage cell.

5. The apparatus of claim 4, wherein the measure of the ESR of the energy storage cell is at least one of a voltage proportional to a temperature of the energy storage cell or an ESR value as determined by an energy storage cell health monitor.

6. The apparatus of claim 5, wherein the processing circuit further comprises an analog-to-digital converter feeding a pulse-width-modulation conversion circuit.

7. The apparatus of claim 6, wherein the driving circuit is a switch that opens and closes according to a pulse-width-modulated signal output by the pulse-width-modulation conversion circuit.

8. The apparatus of claim 5, wherein the processing circuit further comprises an ESR value processing circuit feeding a pulse-width-modulation conversion circuit.

9. The apparatus of claim 8, wherein the driving circuit is a switch that opens and closes according to a pulse-width-modulated signal output by the pulse-width-modulation conversion circuit.

10. The apparatus of claim 5, wherein the processing circuit further comprises an analog-to-digital converter, whose input is the voltage and whose output is a digital word, and a digital word conversion circuit, whose input is the digital word and whose output is a second digital word.

11. The apparatus of claim 10, wherein the driving circuit is a digital-to-analog converter that takes, as an input, the second digital word, and outputs an analog voltage to drive the heating element.

12. An apparatus, comprising:
    a printed circuit board;
    an energy storage cell mounted on the printed circuit board;
    a heating element in thermal communication with the energy storage cell,
    the heating element completely positioned between the printed circuit board and the energy storage cell;
    a thermistor coupled to the energy storage cell,
    the thermistor positioned between the printed circuit board and the energy storage cell;
    an analog-to-digital converter coupled to the thermistor;
    a circuit, on the printed circuit board, configured to convert a digital output of the analog-to-digital converter into a pulse-width-modulated signal; and
    a switch, on the printed circuit board, receiving the pulse-width-modulated signal and configured to open or close in accordance with the pulse-width-modulated signal to control a current passing through the heating element to control an equivalent series resistance of the energy storage cell.

13. The apparatus of claim 12,
    wherein the energy storage cell comprises a prismatic cell or flat cell.

14. The apparatus of claim 12, wherein the heating element is a resistive trace defined on the printed circuit board.

15. The apparatus of claim 12, wherein the thermistor is positioned between the printed circuit board and the energy storage cell.

16. The apparatus of claim 12, further comprising thermal insulating material covering a top of the energy storage cell and the heating element is adhered to a bottom of the energy storage cell.

17. The method apparatus of claim 12, further comprising:
    a pull-up resistor configured to supply a bias current to the thermistor, wherein the pull-up resistor and the thermistor form a voltage divider circuit configured to generate an analog voltage output to be converted to the digital output using the analog-to-digital converter, and wherein the analog voltage output comprises a value that is proportional to a temperature of the energy storage cell.

18. A method of controlling an equivalent series resistance of an energy storage cell mounted on a printed circuit board, comprising:
    receiving, at a processing circuit on the printed circuit board, an analog voltage that is proportional to a temperature of the energy storage cell;
    converting, at the processing circuit, the analog voltage to a pulse-width-modulated signal having a duty cycle that is proportional to the analog voltage; and
    driving a switch on the printed circuit board, with the pulse-width-modulated signal, between conductive and non-conductive states to modulate a voltage passing across a heating element in series with the switch, the heating element being in thermal communication with the energy storage cell, the heating element completely positioned between the printed circuit board and the energy storage cell, wherein the duty cycle of the pulse-width-modulated signal is adjusted to maintain the temperature of the energy storage cell at or above a target temperature, the heating element defined resistive traces on the printed circuit board below the energy storage cell.

19. The method of claim 18, further comprising:
    controlling the equivalent series resistance of the energy storage cell by maintaining the temperature of the energy storage cell at or above the target temperature.

20. The method of claim 18, wherein the analog voltage that is proportional to the temperature of the energy storage cell is derived from a thermistor that is in thermal communication with the energy storage cell and positioned between the printed circuit board and the energy storage cell.

* * * * *